(12) United States Patent
Foore et al.

(10) Patent No.: US 7,184,401 B2
(45) Date of Patent: Feb. 27, 2007

(54) LINK-AWARE TRANSMISSION CONTROL PROTOCOL

(75) Inventors: Lawrence R. Foore, Palm Bay, FL (US); Kevin L. Farley, Palm Bay, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 957 days.

(21) Appl. No.: 09/777,557

(22) Filed: Feb. 5, 2001

(65) Prior Publication Data

US 2002/0106991 A1 Aug. 8, 2002

(51) Int. Cl.
*H04L 12/26* (2006.01)
*H04L 12/66* (2006.01)
*G06F 15/16* (2006.01)

(52) U.S. Cl. ............... 370/231; 370/235; 370/349; 370/401; 709/235; 714/749

(58) Field of Classification Search .......... 370/235, 370/236, 230, 231, 310, 328, 331, 349, 352, 370/401, 389, 400, 465, 469; 709/230, 232, 709/235, 238; 710/29; 714/748, 749
See application file for complete search history.

(56) References Cited

U.S. PATENT DOCUMENTS

| 4,536,877 | A | * | 8/1985 | Livingston et al. | ......... | 714/749 |
|---|---|---|---|---|---|---|
| 4,584,679 | A | * | 4/1986 | Livingston et al. | ......... | 714/749 |
| 5,224,095 | A | * | 6/1993 | Woest et al. | ................. | 370/401 |
| 5,528,605 | A | * | 6/1996 | Ywoskus et al. | ........... | 714/749 |
| 5,572,678 | A | * | 11/1996 | Homma et al. | ............. | 709/227 |
| 5,959,995 | A | * | 9/1999 | Wicki et al. | ................. | 370/400 |
| 5,974,028 | A | * | 10/1999 | Ramakrishnan | ............. | 370/229 |
| 6,021,124 | A | * | 2/2000 | Haartsen | ..................... | 370/336 |
| 6,205,498 | B1 | * | 3/2001 | Habusha et al. | ............... | 710/29 |
| 6,208,620 | B1 | * | 3/2001 | Sen et al. | .................... | 370/231 |
| 6,393,023 | B1 | * | 5/2002 | Shimizu et al. | ............. | 370/389 |
| 6,446,144 | B1 | * | 9/2002 | Habusha et al. | ............... | 710/29 |
| 6,603,744 | B2 | * | 8/2003 | Mizutani et al. | ............ | 370/310 |
| 6,765,869 | B2 | * | 7/2004 | Chintada et al. | ............ | 370/230 |
| 6,765,870 | B2 | * | 7/2004 | Chintada et al. | ............ | 370/230 |
| 6,876,639 | B1 | * | 4/2005 | Cao | ........................... | 370/331 |

OTHER PUBLICATIONS

Brown, Kevin, and Singh, S., "M-TCP: TCP for Mobile Cellular Networks." Jul. 29, 1997. www.acm.org/sigcomm/ccr/archive/1997/oct97/ccr-9710-brown.pdf (Mar. 18, 2002).

* cited by examiner

*Primary Examiner*—Alpus H. Hsu
(74) *Attorney, Agent, or Firm*—Volpe and Koenig, P.C.

(57) ABSTRACT

In a TCP/IP network, congestion control techniques such as slow start and congestion avoidance are employed. Such networks include wired and wireless links. However, normal operation of the wireless links exhibit different latencies than those exhibited over the wired link. The protocols employed in the wired network do not lend themselves well to efficient communication over wireless connections, and can cause slow start to be triggered. Determining when a sender will timeout due to non-receipt of an ACK, and intervening with a suppression message having an advertised window of zero to pause the user, are employed to prevent congestion control mechanisms such as slow start and congestion avoidance from activation

33 Claims, 10 Drawing Sheets

LINK-AWARE TRANSMISSION CONTROL PROTOCOL

BACKGROUND OF THE INVENTION

Wireless network infrastructure equipment is increasingly being used to allow computing devices to communicate over a wireless medium to a wired network such as the Internet. In a wireless data network, a plurality of local computing devices, such as PCs, are supported via wireless subscriber access units. Each subscriber access unit (SAU) provides a wireless radio link to a base station processor. The base station processor (BSP) is also connected to an Internet gateway that provides a connection to a wired network.

Wired networks typically employ congestion control techniques to detect the speed with which messages are propagated across the network to a recipient. These techniques reduce congestion through avoiding overburdening a recipient with messages by reducing the rate at which messages are sent, and consequentially reducing throughput. However, normal operation of the wireless network exhibits different latencies than those exhibited during normal operation of the wired network. Accordingly, such techniques can interpret the queuing of messages at the base station processor as congestion, and accordingly, reduce throughput. In general, the protocols employed in the wired network do not lend themselves well to efficient communication over wireless connections.

In a TCP/IP network, for example, congestion control techniques such as slow start and congestion avoidance are employed. In accordance with the slow start technique, as defined in Internet RFC 2581, an acknowledgment message (ACK) is expected as a response to every second packet (message) sent. A sliding window protocol is employed to regulate the number of unacknowledged messages which can be outstanding at any time. This sliding window, which is indicative of the number of unacknowledged message permitted at any time, is initially set at a low number, typically two messages. The number of messages permitted in the window is gradually increased as the ACKs are received in a timely manner. If, however, an ACK is not received after a timeout threshold, or if duplicate ACKs are received, the window may be reset to the initial value (typically one) and must again be permitted to gradually increase as described above.

The queuing of messages at the base station processor, however, is not necessarily indicative of congestion in the wireless network. Rather, the queuing is indicative of the propagation delay or the assignment delay of wireless resources. This propagation delay is interpreted, however, as congestion by the wired line protocols such as TCP/IP when the ACK is not received within the timeout expected by the wired network. Accordingly, the wireless connection tends to be throttled back to a sliding window of two by slow start more frequently, thereby reducing throughput.

Another TCP/IP congestion control parameter employed by congestion avoidance and slow start is an advertised window. The advertised window is contained in the ACK and informs the sender how many more messages the receiver can accept. This prevents a sender from overburdening a receiver with more packets than it can buffer, therefore avoiding sending packets which are likely to be dropped or result in a timeout. While technically separate, the slow start and congestion avoidance mechanisms are typically implemented in a complementary manner. The sliding window and slow start are congestion control imposed by the sender, while the advertised window is congestion control imposed by the receiver.

A further aspect of the advertised window mechanism is a persist mode. When a receiver can accept no more data, it sends a message having an advertised window of zero. This transmission has the additional effect of preventing the sender from sending any more data until the receiver sends another ACK message with a nonzero advertised window. Persist mode, therefore, allows the receiver to "pause" the sender until more messages can be processed at the receiver side. However, an ACK indicating an advertised window of zero does not trigger slow start and reset the sliding window.

It would be beneficial, therefore, to provide a system and method for determining when a connection including a wireless link is about to experience a timeout, and sending a suppression message to trigger a persist mode to avoid slow start from resetting the window size, while maintaining the same TCP/IP end-to-end connection between the sender and receiver to avoid tearing down and buffering messages to accommodate the wireless latency.

SUMMARY OF THE INVENTION

In a multiplexed system, multiple users share access to physical layer resources, such as radio channels. There are always delays inherent in assignment and reassignment of the physical layer resource, which propagate up to the higher protocol layers. Such additional delays are not insignificant. For example, a Round Trip Transfer (RTT) delay may be on the order of one second in a typical TCP/IP network layer protocol, whereas physical layer resources may require 200 milliseconds or more to reassign. Thus, a time out mechanism which only accommodates the return layer delay will unnecessarily time out prematurely.

A system and method are disclosed for monitoring and controlling message delivery from a remote node by detecting when an incoming message is received, determining a timeout corresponding to the timing of the acknowledgment message, and sending a suppression message if the acknowledgment message has not been sent to the remote node before the timeout expires. The invention prevents activation of congestion control mechanisms which reduce throughput. By determining when a sender will timeout due to non-receipt of an ACK, and intervening with a suppression message to pause the sender, congestion control mechanisms such as slow start and congestion avoidance are prevented from activation. In this manner, the reduction in message throughput caused by congestion control mechanisms is avoided, thereby allowing the sender to resume message delivery at the same rate at which it was delivering messages when the suppression message was received.

Sending a suppression message, therefore, prevents the sender from timing out for failure to receive a timely ACK. Since the sliding window is not reset to the initial size, as would have occurred if a timeout occurred, the receiver can send a resume message when the ACK is received. The sender then resumes message transmission with the same window size that was in effect when the suppression message was received. Since a larger window potentially allows more packets to be sent at a time, message traffic throughput is increased.

The connection and associated parameters between the sender and receiver remain consistent throughout the pause periods. Since the connection remains a single end-to-end connection, no tearing down or setting up of connections and buffering messages received in the interim, is required. Further, no connection parameters at either the sender or receiver in the wired network need be modified to conform to differences in the wired and wireless communication links. In this manner, the users served by the wireless link are less burdened with the wired link congestion control mechanisms which can tend to have a negative result on throughput over a wireless link.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
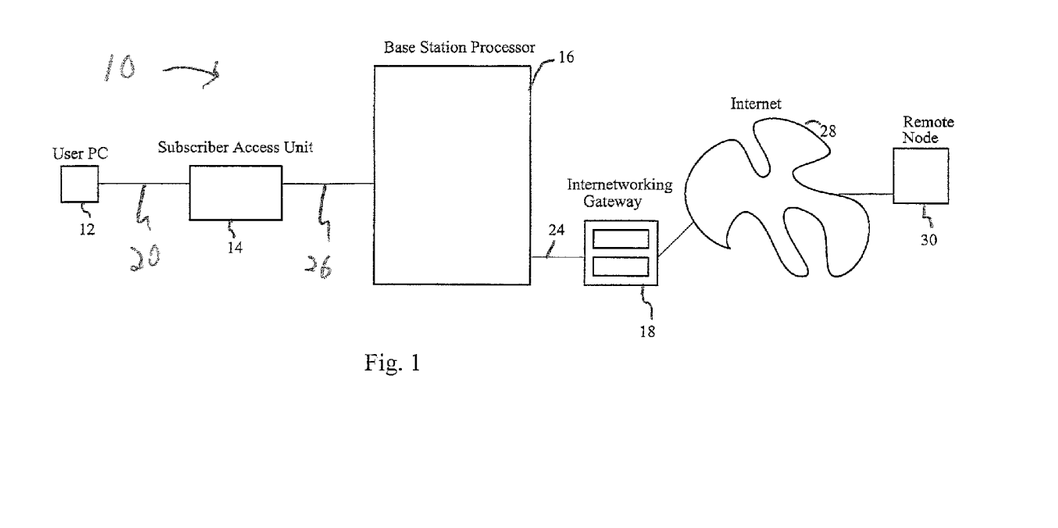
FIG. 1 shows a wireless communication system operable to perform message transmission according to the link-aware transmission control protocol as defined herein.

A description of a preferred embodiment of the invention follows. FIG. 1 is a block diagram of a communication system 10 operable for link-aware transmissions in a wireless network as defined herein. The communication system includes local computing devices, generally a user PC 12, a subscriber access unit (SAU) 14, a base station processor (BSP) 16, and an internetworking gateway 18. The user PC 12 is in communication with the subscriber access unit 14 via a wired link 20. The subscriber access unit 14 is in communication with the base station processor 16 via a wireless link 26. The base station processor is in communication with an internetworking gateway 18 via a wired link 24. The internetworking gateway 18 is adapted for communication via a public access network such as the Internet 28 for maintaining a connection with a remote node 30. Note that a single user PC 12 subscriber access unit (SAU) 14 and base station processor (BSP) 16 are shown for illustrative purposes. Multiple SAUs 14 may be interconnected in an actual implementation.

The user PC 12 may therefore be provided access to the internetworking gateway 18, which may include any remote entity located on the Internet 28 or other network, through a combination of the wired 20, 24 and wireless links 26 provided. The wired links 20,24 are typically supported by a protocol such as TCP/IP or UDP/IP. The wireless link is supported by a wireless link protocol such as IS95 or another wireless link protocol such as the protocol described in pending U.S. Patent Application entitled "Dynamic Frame Sizing Settings for Multichannel Transmission," published as PCT application No. WO 99/44341, Sep. 2, 1999.

Typically, the PC 12 provides a data packet, which may for example be an Internet Protocol (IP) packet, to the subscriber access unit 14 over the wired link 20, which may for example be an Ethernet type connection. The subscriber access unit 14 removes the framing of the data packet and transfers the data in the data packet to the base station processor 16 over the wireless link 26 in accordance with the wireless link protocol. The base station processor 16 extracts the wireless link frames and forwards them, in data packet form, over the wired link 24 to the internetworking gateway 18.

Similarly, packets sent from the public access network are sent to the base station processor 16 over the wired link 24, transmitted to the corresponding subscriber access unit 14 over the wireless link 26, and sent to the user PC 12 over the wired link 20. The subscriber access unit 14 and the base station processor 16 therefore denote endpoints of the wireless link 26, providing for wireless communication from the user PC 12 to the public access network such as the Internet 28.

Figure 2:
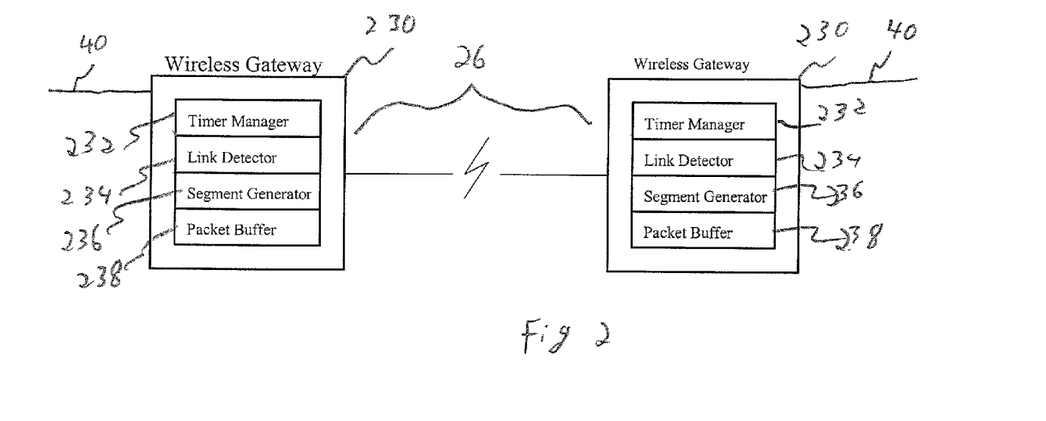
FIG. 2 shows a wireless gateway connection in the wireless communication system of FIG. 1.

In a network including a wireless link, therefore, a point to point connection is maintained between two entities via the wireless link. Accordingly, since bidirectional communication is provided, the base station processor 16 and the subscriber access unit 14 each provide a wireless gateway 230 supporting the wireless link 26. Referring to FIG. 2, a wireless link 26 is shown between wireless gateways 230. Since the communication is bidirectional, the system and methods described below are applicable to wireless gateways 230 on either side of the wireless link 26.

The wireless gateways 230 each include a timer manager 232, a link detector 234, a segment generator 236, and a packet buffer 238. The timer manager 232 computes the round trip time corresponding to the time at which an ACK message is expected. When an incoming message is received from a wired link 40, a timer is set just prior to the time at which the corresponding sender will timeout for failure to receive the ACK. The incoming message is then forwarded over the wireless link 26. If the timer expires before the corresponding ACK is received over the wireless link 26, the segment generator 236 generates a suppression message, and sends it to the sender (not shown) over the wired link 40. The suppression message tells the sender to not send any more messages until the receiver sends a resume message. When the corresponding ACK is received from the wireless network, it is stored in the packet buffer 238. The segment generator 236 forwards the ACK message to the sender over the wired link 40. The sender then interprets this as a resume message.

Previous prior art approaches include MTCP, outlined in Brown, et al., "M-TCP: TCP for Mobile Cellular Networks," Dept. of Computer Science, University of South Carolina, Jul. 29, 1997. This paper described a method using pico-cell cellular networks which implemented an altered TCP stack. The M-TCP system did not maintain a single point-to-point connection between a wireless subscriber and wired network server, but rather terminated the wired TCP connection and instantiated a separate connection over the wireless link, and employed a slightly modified TCP/IP stack on the user computer.

Figure 3:
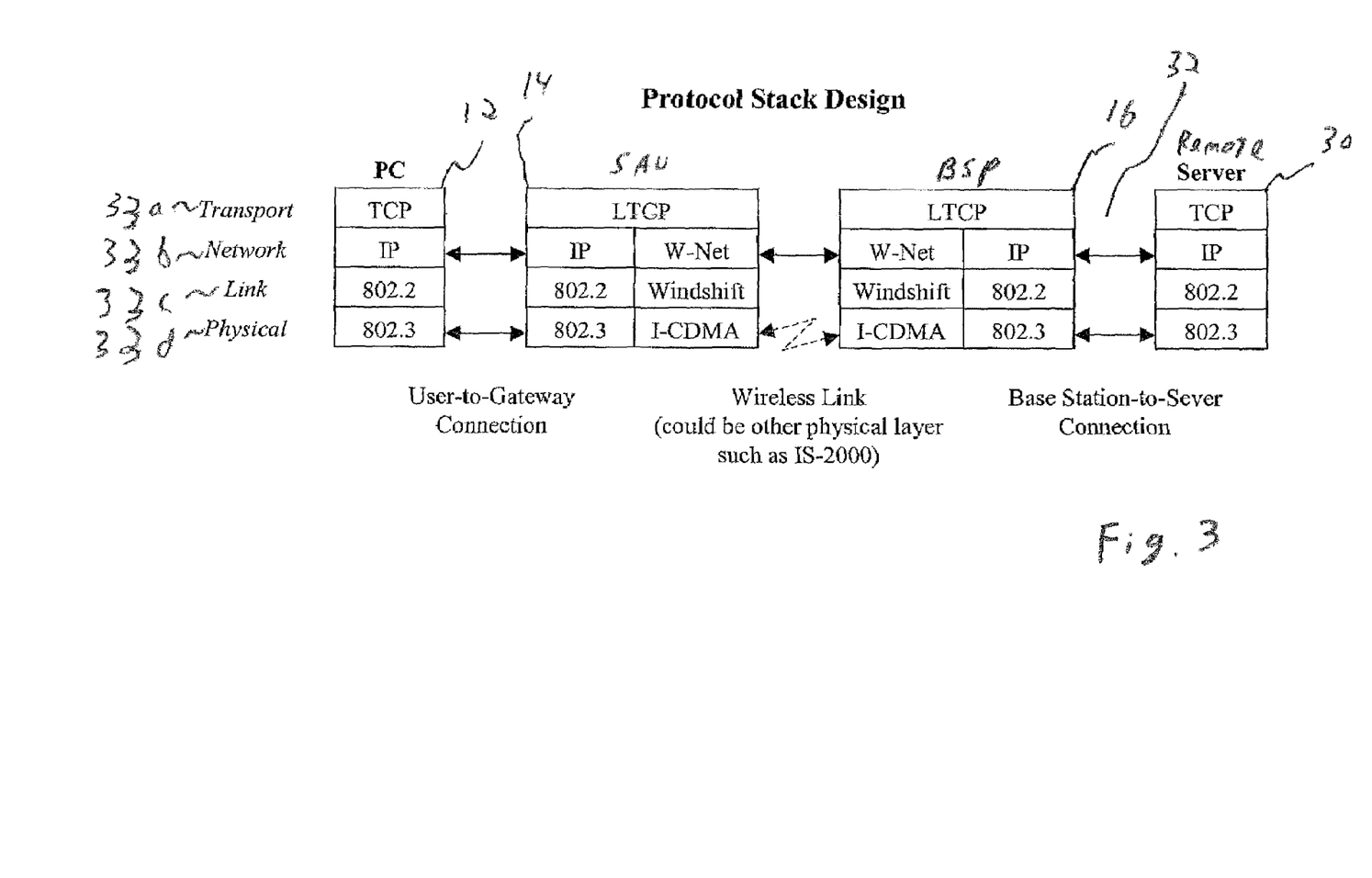
FIG. 3 shows a protocol stack for performing the link-aware transmission control protocol as defined herein.

Referring to FIG. 3, a TCP/IP stack corresponding to the wireless network is shown. The link-aware transmission control protocol (LTCP) defined herein is disclosed. The protocols supporting the point-to-point connection 32 between the remote server 30 and the local user PC 12 are shown, including the transport 33a, network 33b, link 33c, and physical 33d layer protocols.

Figure 4:
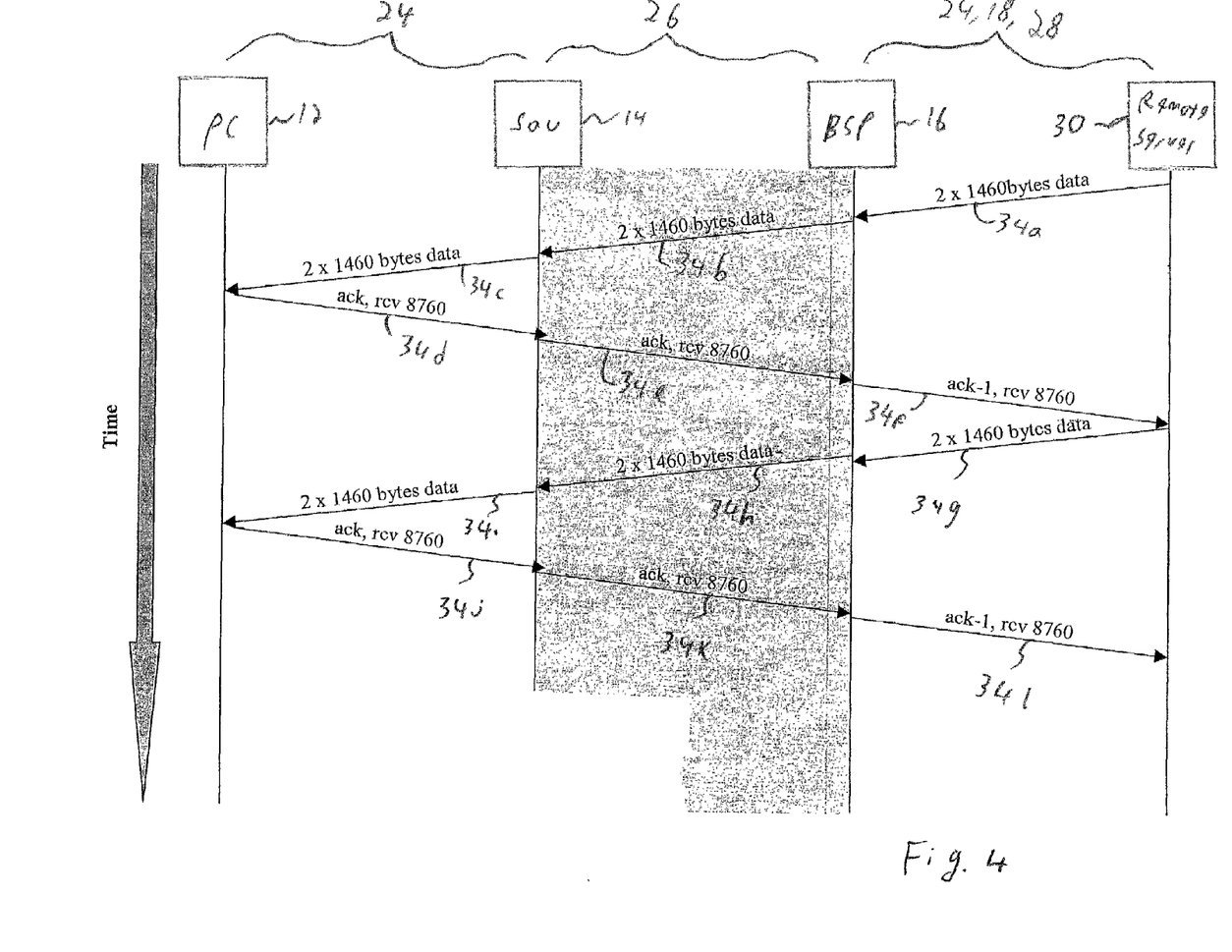
FIG. 4 shows message transmission as defined by the present claims.

Referring to FIGS. 4 and 1, a diagram of message transmission is shown. The remote server 30 transmits two messages at 34a to the BSP 16, each containing 1460 bytes of data, over the connection on the wired links 24, 18, and 28. The BSP 16 transmits the messages to the SAU 14 over the wireless link 25 at 34b. The SAU 14 transmits the messages to the user PC 12 at 34c over the wired link 24. The user PC 12 responds with an ACK advertising a receive window of 8760 back to the SAU 14, as shown at 34d.

It should be noted, for reasons which will become apparent below, that in a TCP/IP connection, the ACK messages indicate the last byte received, and may correspond to more than one received packet. Accordingly, the ACK messages need not complement the received messages on a one to one basis. Further, since the ACK indicates only the last byte successfully received, and not the last packet, an ACK message can indicate successful receipt of a subset of the bytes in the received packet. Additionally, since TCP/IP typically performs other retransmission mechanisms, the methods described herein perform optimally in conjunction with a relatively persistent link layer.

The SAU 14 transmits the ACK back to the BSP 16 over the wireless link 26 at 34e. The BSP 16, however, transmits an ACK message indicating successful receipt of one byte less than the ACK received from the SAU 14 at 34f. In accordance with the invention as defined by the present claims, the ability to send a suppression message to pause the sender is kept available by retaining one outstanding unacknowledged byte. A TCP/IP connection does not respond well to unsolicited or duplicate ACK messages, and such ACKs can also have the effect of triggering slow start and closing the sliding window. Since an advertised window is typically sent with an ACK of one or more bytes, retention of one unacknowledged byte preserves the ability to send a suppression message, described further below, by generating a TCP/IP message segment including an acknowledgment of the outstanding, unacknowledged byte and an advertised window of zero.

The remote server 30 receives the ACK of all but the last of the bytes sent over the wired link 24, 18, 28 at 34f. Since the advertised window is still 8760, the remote server sends another 2920 (2*1460) bytes at 34g. These message packets are transmitted to the user PC 12 via 34g, 34h, and 34i similarly to 34a, 34b, and 34c above. The user PC again responds with an ACK of the 2920 bytes in the two message packets at 34j. The SAU 14 transmits across the wireless link 26 back to the BSP 16 at 34k. The BSP again sends an ACK of all but the very last outstanding byte back to the remote server 30. Since an ACK indicates successful receipt of all bytes up to and including the byte indicated in the ACK, this ACK has the effect of also acknowledging receipt of the outstanding byte not ACKed at 34f.

In a TCP/IP network, it is preferable to maintain the end-to-end semantics between communicating nodes, rather than implementing a series of connections to maintain communication. In the system as disclosed herein, the end-to-end semantics of the connection between the remote server 30 and the PC 12 are maintained according to the TCP/IP protocol. Accordingly, a single point-to-point TCP/IP connection is maintained.

Figure 5:
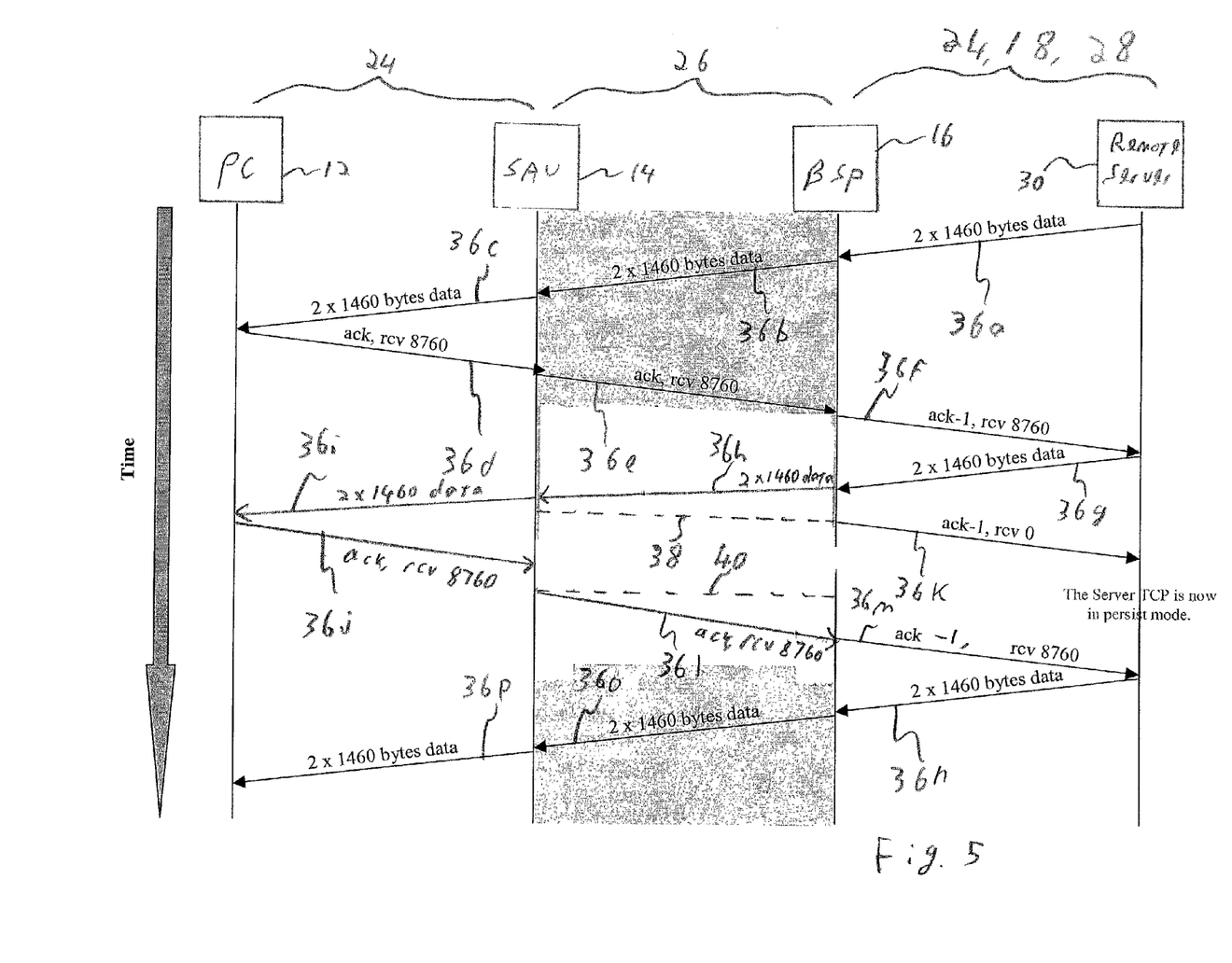
FIG. 5 shows transmission of a suppression message.

FIG. 5 shows transmission of a suppression message. Referring to FIGS. 5 and 1, the remote server 30 sends two message packets including 2920 (2*1460) bytes of data to the BSP 16 at 36a. The message packets are transmitted from the BSP 16 to the SAU 14 at 36b, and from the SAU 14 to the user PC 12 at 36c. The PC 12 sends the ACK back at 36d, 36e, and 36f, similar to as in FIG. 4 above, again reserving the last byte as unacknowledged by the BSP 16 at 36f. At 36g, the remote server sends another two packets totaling 2920 bytes (2*1460), and the BSP 16 transmits these over the wireless link to the SAU 14 at 36h, which in turn transmits to the PC 12 at 36i. At the time shown by dotted line 38, however, a problem is detected on the wireless link which will delay the transmission of the ACK from the SAU 14 to the BSP 16. Such a problem includes detection of a loss of the wireless link, as may occur when the SAU 14 travels outside the range of the BSP 16, or an eminent timeout at the remote server 30 before an ACK should have been received, both described further below.

In response to the delayed ACK, the BSP 16 generates and sends a suppression message at 36k. The suppression message includes an acknowledgment of the outstanding unacknowledged byte of 36f, and an advertised window of zero. As described above, in accordance with TCP/IP, an advertised window of zero has the effect of preventing the sender from sending additional message packets until a non-zero advertised window is received, effectively pausing the remote node 30 in a persist mode.

The actual ACK from the transmission at 36i is sent from the PC 12 to the SAU 14 at 36j, and queued at the SAU 14. At the time shown by dotted line 40, the wireless link is available and the ACK transmitted to the BSP 16 at 36l. The BSP 16 sends an ACK of all but one outstanding byte to the remote node 30 at 36m, again reserving the ability to send a suppression message, and indicates a non-zero advertised window of 8760 bytes, permitting the remote node 30 to again send message packets to the PC 12 at 36n, 36o, and 36p.

Figure 6:
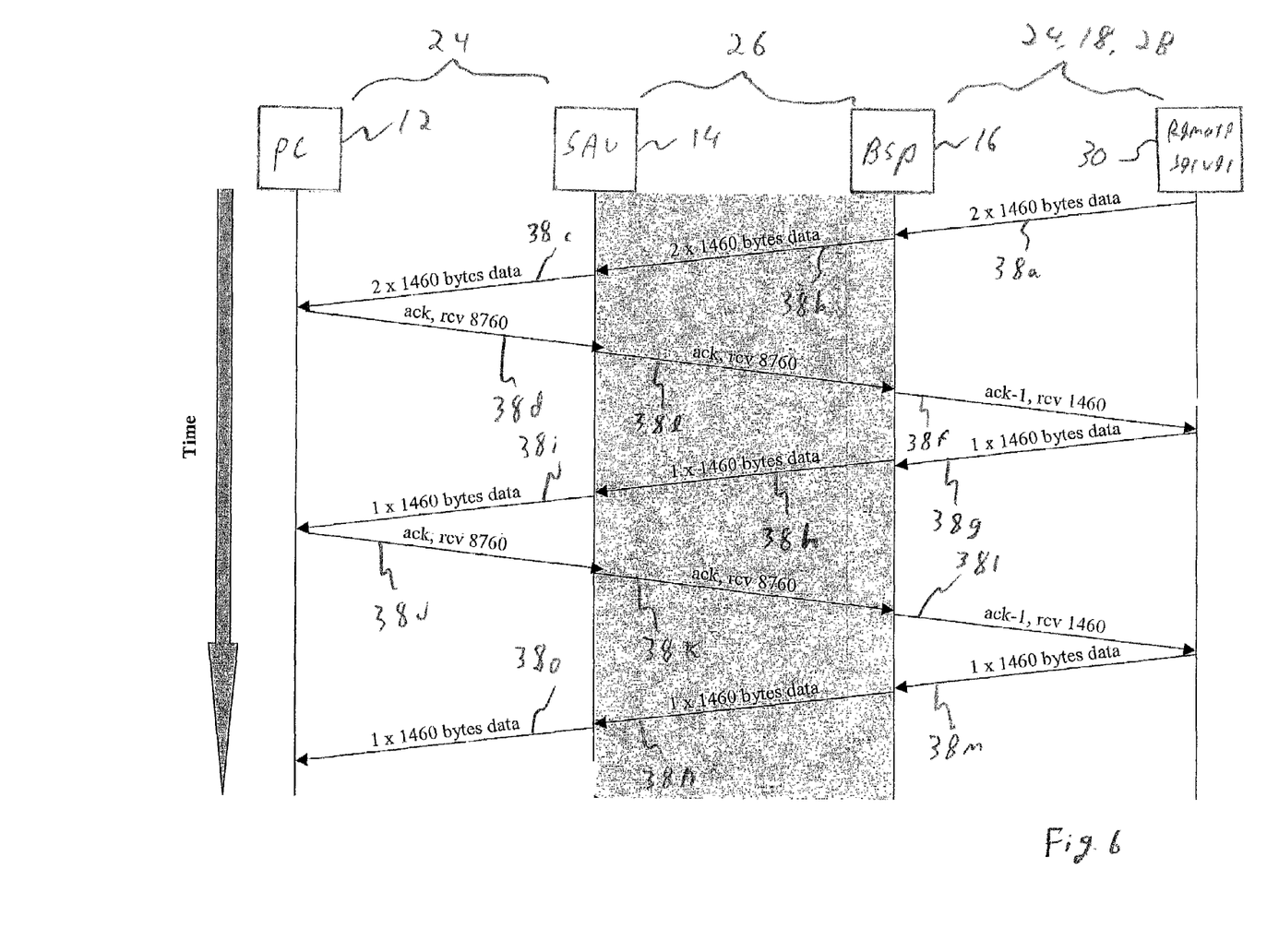
FIG. 6 shows an alternate embodiment modifying the advertised window.

FIG. 6 shows another particular embodiment in which the suppression message reduces the advertised window. In this embodiment, the advertised window is not zero, but is a value reduced from that which was sent by the PC. In this manner, the remote node 30 is not paused in persist mode, but is limited by the amount of data which will be sent as determined by the BSP 16. Referring to FIG. 6, the remote server transmits two message packets to the PC 12 at 38a, 38b, and 38c. The PC responds with the ACK, sent at 38d and 38e. The BSP 16, however, reduces the advertised window by a factor of 6 from 8760 to 1460, and again reserves an unacknowledged byte at 38f. Reducing the advertised window reduces the load on the BSP 16. This action may occur for various reasons, such as high cell load, low buffer resources, and GoS (Grade of Service) or QoS (Quality of Service) provisions. A similar thread continues from 38g–38m.

In the above examples, the BSP 16 and SAU 14 are employed as exemplary wireless gateways for illustrative purposes. The system and method described above is adaptable to a wireless gateway on either side of a wireless link. Accordingly, the discussion below will employ the term "wireless gateway" to refer to an endpoint on either side of the wireless link, and accordingly, is equally applicable to either a BSP 16 or a SAU 14 or other node operable for wireless communication over an RF (radio frequency) medium.

Figure 7:
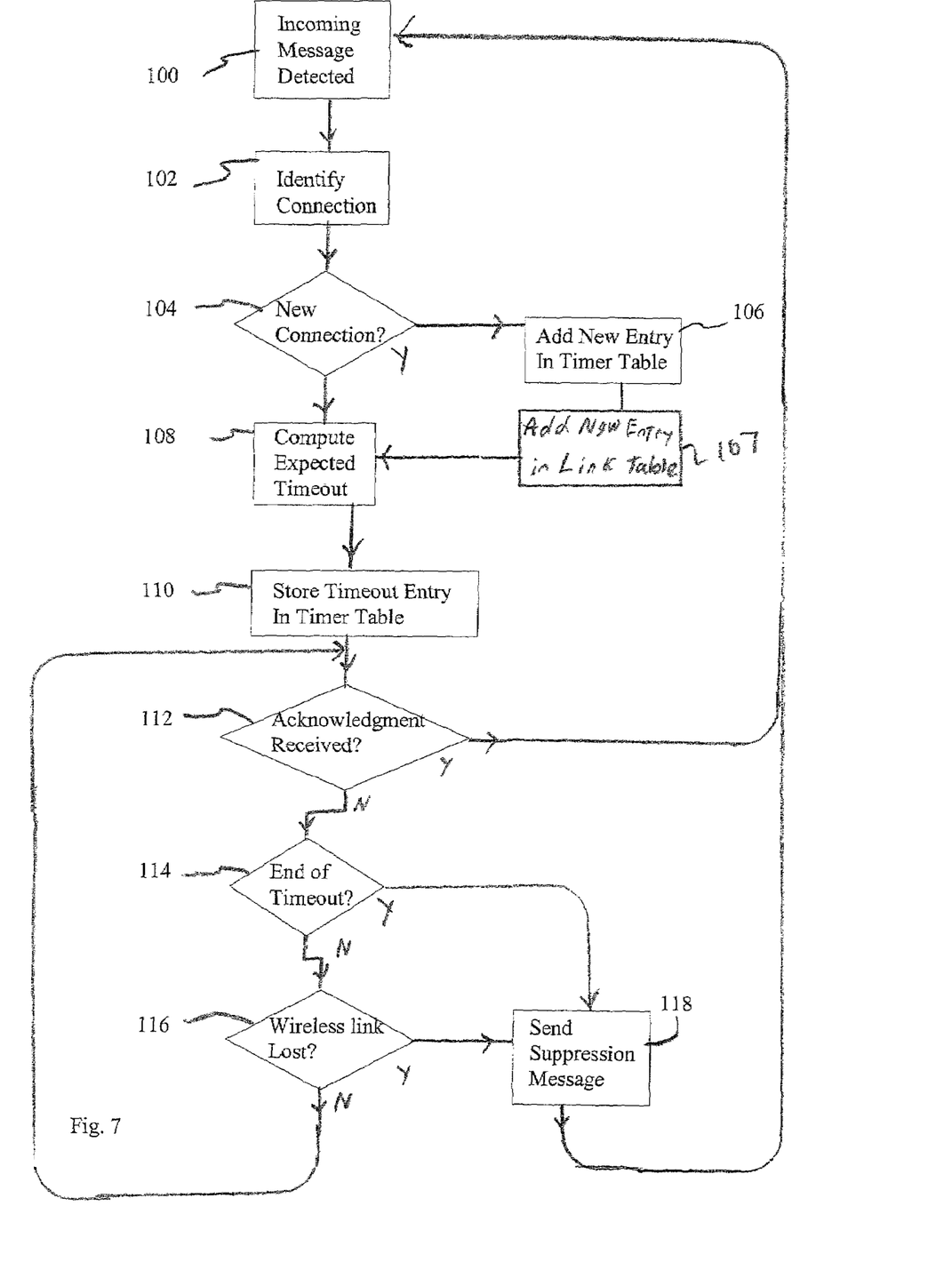
FIG. 7 shows a flowchart of message transmission.

FIG. 7 shows a flowchart of a particular embodiment of link-aware message transmission at a wireless gateway. Referring to FIG. 7, an incoming message packet is detected, as depicted at step 100. A connection corresponding to the incoming message is examined, as shown at step 102. A check is performed to determine if this message packet represents a new connection as disclosed at step 104. If this is a new connection, a corresponding entry is made in the timer table, as disclosed at step 106. A corresponding entry is also made in the link table, as depicted at step 107. An expected timeout is computed by first determining the RTT delay. A latency threshold corresponding to the propagation time from the wired link over the wireless gateway is determined. Jacobsen, V. 1990 "Berkley TCP Evaulation 4.3-Tahoe to 4.3-Reno," Proceedings at the Eighteenth Internet Engineering Task Force, p. 365 (September, 1990), University of British Columbia, Vancouver, B.C., describes a standard technique for determining latency time at periodic given RTT delays In the preferred embodiment, RTT is determined by noting the time at which a data segment is received from the remote service 30. The segment is then forwarded over the wireless link, and the BSP 16 then waits for the ACK to be returned from the wireless gateway, as shown at step 108. The latency threshold is subtracted from the determined RTT to compute an expected timeout entry by which the ACK should be received. The expected timeout is stored in the timer table to correspond to the connection, as disclosed at step 110. A check is performed to determine if an ACK is received before the expected timeout expires, as shown at step 112. If the ACK is received, control reverts to step 100 to wait for the next message packet, as shown at step 112. If the ACK is not received, a check is made to determine if the expected timeout has expired, as depicted at step 114. If the expected timeout has not expired, a check is performed to determine if the wireless link was dropped, as shown at step 116. If either the timeout has expired, as shown at step 114, or the wireless link was lost, as shown at step 116, a suppression message is sent to the remote node 30 to pause the sender in persist mode, as disclosed at step 118, and control reverts to step 100 to wait for the next message packet. If the wireless link was not lost at step 116, control reverts to step 112 to again check for the ACK. Although a polling mechanism is shown for illustrative purposes, the corresponding steps could also be performed employing an interrupt driven implementation without departing from the invention as described and claimed.

Figure 8A:
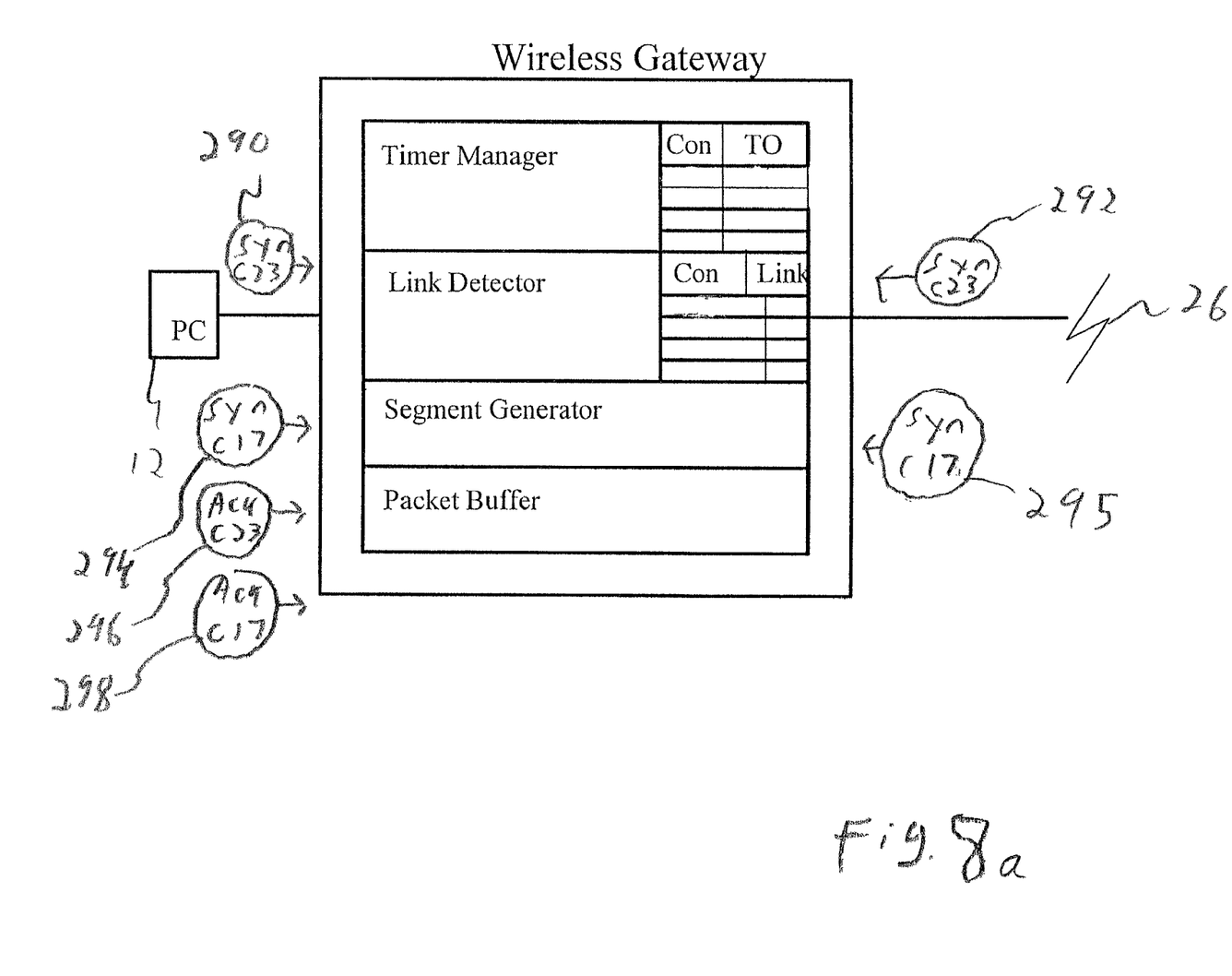
FIGS. 8a–8g show an example of message transmission as defined herein.

FIGS. 8a–8g disclose an example of link-aware transmission corresponding to the flowchart of FIG. 7. Referring to FIG. 8a, two connections are established as per the known TCP/IP protocol connection handshake. A first connection C23 is attempted as the PC 12 sends a SYN message 290. The remote node (30, FIG. 1) responds with a SYN 292 over the wireless link 26. The PC 12 then sends a SYN ACK message 296, completing connection C23. A second connection is similarly established for C17, by SYN 294, SYN 295, and SYN ACK 298, establishing connection C17.

Figure 8B:
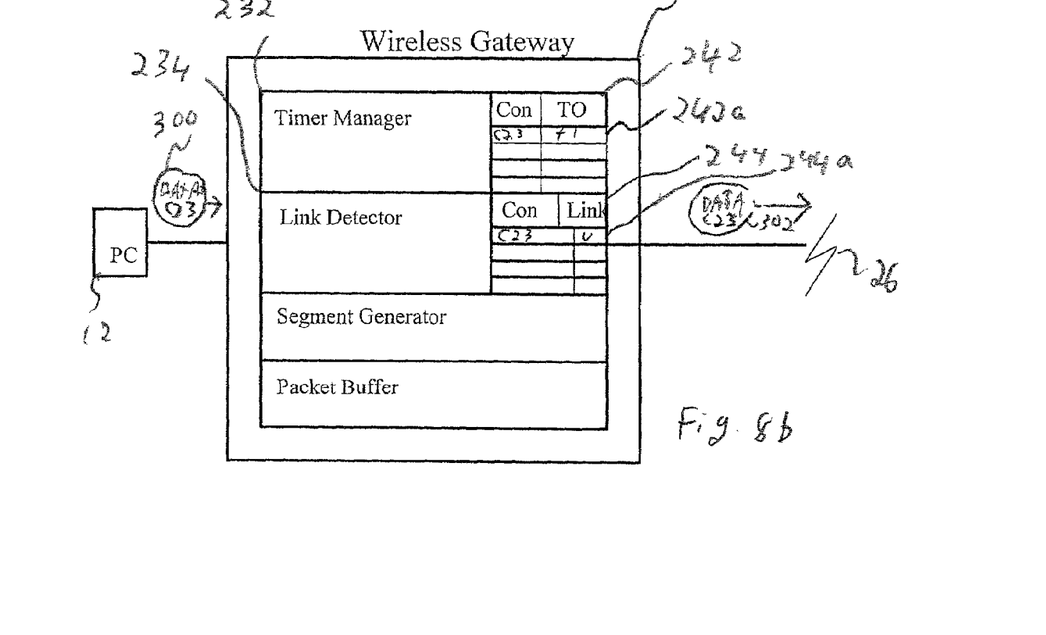

Referring to FIG. 8b, the user PC 12 sends a bulk data message packet 300 to a remote node via the wireless gateway 230. Note that in this example, the user PC 12 is transmitting data packets and the remote node 30 is sending ACKs, to illustrate the bidirectional nature of message transmission. The timer manager 232 in the wireless gateway 230 determines that this message corresponds to a new connection C23, and creates a corresponding entry 242a in the timer table 242 having an expected timeout value of T1. Note that the timer table and link table entries are created upon the first transmission of a data message 300, not during the connection handshake sequence described above with respect to FIG. 8a. A new entry 244a is also created in the link detector table 244 to correspond to connection C23 with a link status of U (up). The message 300 is sent over the wireless link 26 at 302.

Figure 8C:
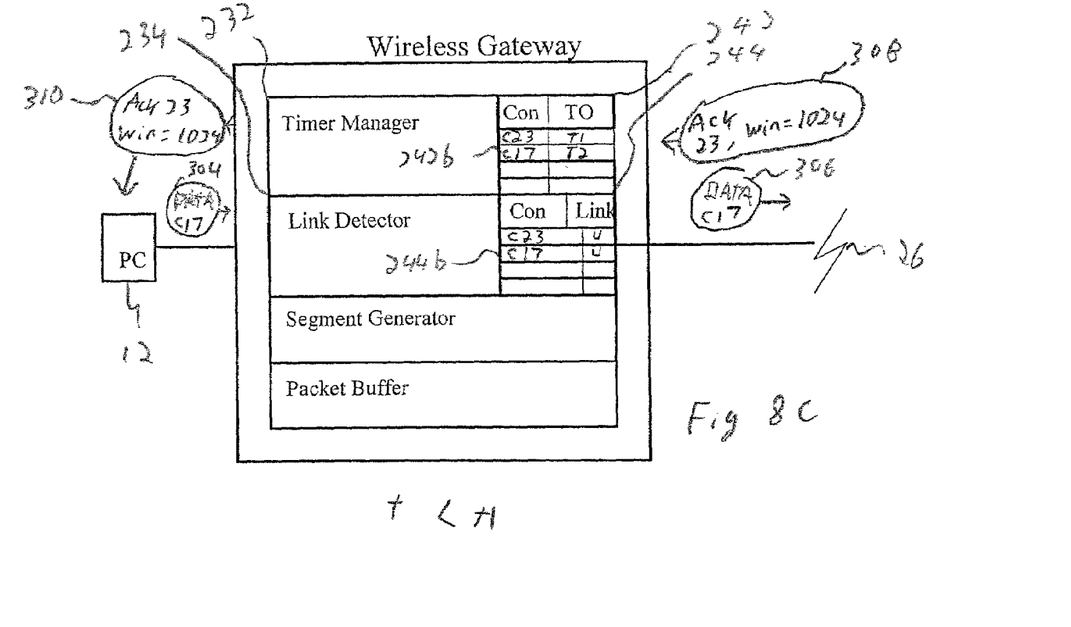

Referring to FIG. 8c, another bulk data message packet 304 is sent from the PC 12, corresponding to connection C17. Accordingly, new entries 242b and 244b are created in the timer manager table for T2 and the link detector table for U, respectively, and the message 304 is sent over the wireless link 26 at 306. Also, at a time less than T1, an ACK 308 is received for connection C23, and advertises a receive window of 1024. The timer manager 232 cancels the expected timeout T1 for connection C23, and the ACK is modified 310 to leave one unacknowledged byte, and is forwarded through the wireless gateway to the PC 12.

Figure 8D:
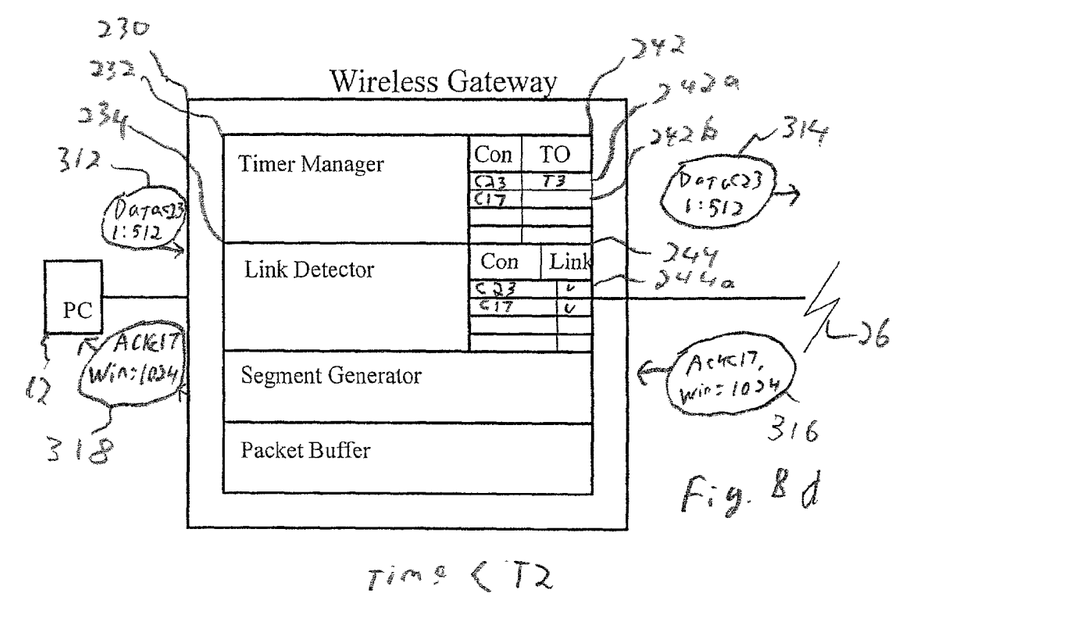

Referring to FIG. 8d, a message packet containing 512 bytes is sent from the PC 12 to the wireless gateway 230 on connection C23. The timer manager computes a new expected timeout T3 timeout and updates the entry 242a for connection C23. Alternatively, the entry 242a could have been deleted when the ACK 308 (FIG. 8c) was received and a new entry created for the message packet 312. The message packet 312 is transmitted over the wireless link at 314. Continuing to refer to FIG. 8d, at a time less than T2, an ACK 316 is received for connection C17. The timer manager updates the timer table entry 242b corresponding to connection C17, and the ACK is forwarded to the PC 12 at 318.

Figure 8E:
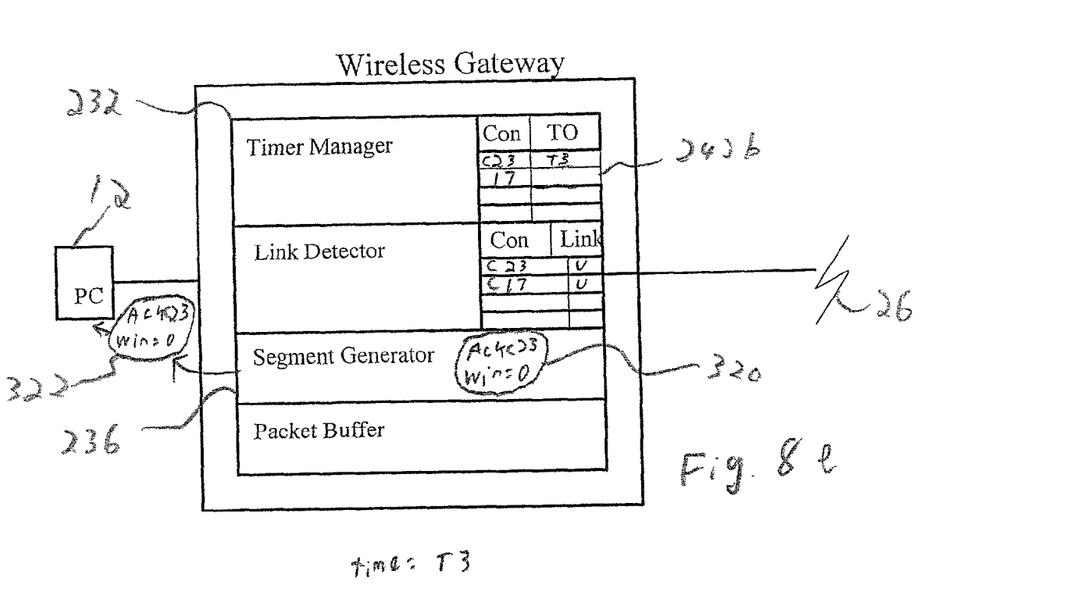

Referring to FIG. 8e, time T3 has elapsed and accordingly, expected timeout T3 of timer table entry 242a is triggered. The timer manager 232 directs the segment generator 236 to generate a suppression message for connection C23 before the PC 12 experiences a timeout for failure to receive an expected ACK. The segment generator 236 generates a suppression message 320 ACKing the last byte of the last acknowledged message packet (308, FIG. 8c) sent and advertising a receive window of zero, and sends it to the PC 12 at 322, pausing the PC 12 in persist mode with respect to connection C23.

Figure 8F:
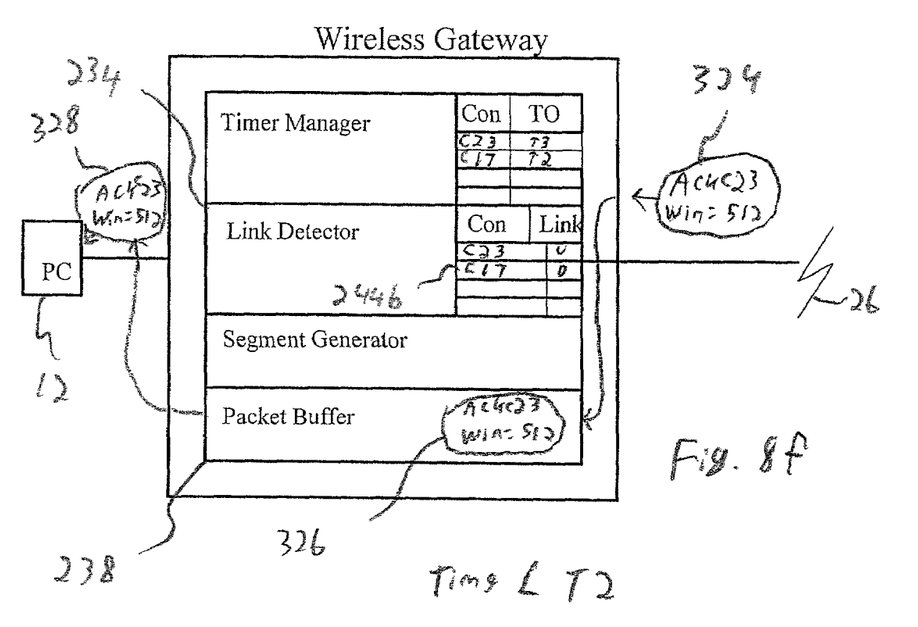
Figure 8G:
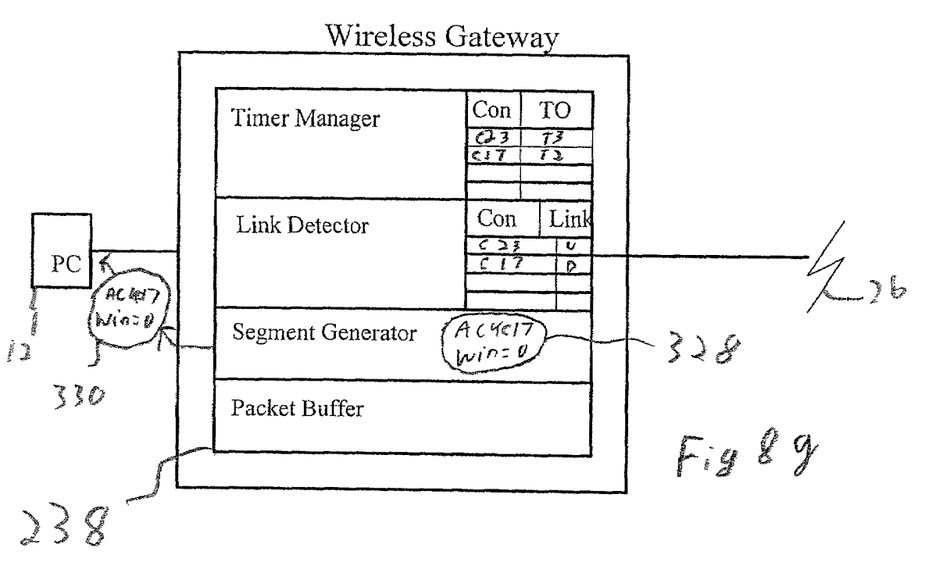

Referring to FIG. 8f, the ACK 324 on connection C23 corresponding to the message packet 314 is received at the wireless gateway 230 and is queued in the packet buffer 238 at 326, until it can be sent to the PC 12 at 328, advertising a window of 512 and removing the user PC 12 from persist, or pause mode. Referring to FIGS. 8f and 8g, the wireless link corresponding to connection C17 is dropped, as indicated by link table entry 244b having a value of D (down). Accordingly, prior to the expiration of the expected timeout T2 for connection C17, the link detector 234 immediately directs the segment generator to generate a suppression message 328 for connection C17, which is sent to the PC at 330. Note that time T2 need not necessarily precede time T3 because the RTT determinations for the two connections may be different.

Those skilled in the art should readily appreciate that the programs defining the operations and methods defined herein are deliverable to a wireless gateway in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for link-aware message transmission have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of monitoring and controlling message delivery over a single point-to-point connection including a wireless link between a sending node and a receiving node comprising:

establishing a single point-to-point connection including a wireless link between a sending node and a receiving node, the sending node and the receiving node both communicating over the connection using a common communication protocol;

detecting when an incoming message that is destined for the receiving node is received over the connection from the sending node by examining the incoming message;

determining a timeout corresponding to the time at which an acknowledgment message is expected over the connection from the receiving node by the sending node in response to the incoming message;

forwarding the incoming message over the connection to the receiving node; and sending a suppression message over the connection to the sending node if the acknowledgment message has not been sent to the sending node before the timeout expires, the suppression message suspending messages from being sent by the sending node to the receiving node.

2. The method of claim 1 further comprising sending a resume message to the sending node.

3. The method of claim 2 wherein the resume message is sent when the acknowledgment message is sent.

4. The method of claim 2 wherein the resume message is the acknowledgment message.

5. The method of claim 1 further comprising forwarding the incoming message over a wireless link to a user.

6. The method of claim 5 further comprising receiving the acknowledgment from the user via the wireless link.

7. The method of claim 5 further comprising sending the suppression message immediately if the wireless link was lost.

8. The method of claim 1 wherein determining further comprises determining a round-trip time.

9. The method of claim 8 wherein determining further comprises setting a timer in a timer table.

10. The method of claim 1 wherein sending the suppression message further comprises generating a message segment.

11. The method of claim 10 wherein generating the message segment comprises generating according to a predetermined protocol.

12. The method of claim 11 wherein the predetermined protocol is TCP/IP.

13. The method of claim 12 wherein the suppression message is indicative of an advertised window of zero.

14. The method of claim 1 wherein the detecting and the sending do not require modification of a TCP/IP stack at the user.

15. The method of claim 1 wherein the determining and detecting occur by reading a transport layer segment from a network layer.

16. A system for monitoring and controlling message delivery over a single point-to-point connection including a wireless link between a sending node and a receiving node comprising:

a wireless gateway operable to detect when an incoming message that is destined for a receiving node is received from a sending node over a single point to point connection including a wireless link by examining the incoming message, the sending node and the receiving node both communicating over the connection using a common communication protocol;

a timer manager in the wireless gateway operable to determine a timeout corresponding to the time at which an acknowledgment message is expected over the connection from the receiving node by the sending node in response to the incoming message; and a segment generator in the wireless gateway responsive to the timeout and operable to generate and send a suppression message over the connection to the sending node if the acknowledgment message has not been sent to the sending node before the timeout expires, the suppression message suspending messages from being sent by the sending node to the receiving node.

17. The system of claim 16 wherein the segment generator is further operable to generate and send a resume message to the sending node, wherein the resume message is operable to allow messages to be sent by the sending node.

18. The system of claim 17 wherein the segment generator is operable to send the resume message when the acknowledgment message is sent.

19. The system of claim 17 wherein the resume message is the acknowledgment message.

20. The system of claim 16 wherein the wireless gateway is operable to forward the incoming message over a wireless link to a user.

21. The system of claim 20 wherein the wireless gateway is further operable to receive the acknowledgment from the user via the wireless link.

22. The system of claim 20 wherein the wireless gateway further comprises a link detector operable to determine if the wireless link is lost.

23. The system of claim 22 wherein the link detector is further operable to direct the segment generator to send the suppression message immediately if the link detector detects that the wireless link is lost.

24. The system of claim 16 wherein the timer manager is further operable to determine a round-trip time.

25. The system of claim 24 wherein the timer manager is further operable to set a timer corresponding to the round-trip time in a timer table.

26. The system of claim 16 wherein sending the suppression message further comprises generating a message segment.

27. The system of claim 26 wherein the segment generator generates the message segment according to a predetermined protocol.

28. The system of claim 27 wherein the predetermined protocol is TCP/IP.

29. The system of claim 28 wherein the suppression message is indicative of an advertised window of zero.

30. The system of claim 28 wherein a TCP/IP stack associated with the predetermined protocol and corresponding to the sending node is not modified by the wireless gateway.

31. The system of claim 16 wherein the timer manager is operable to read a network layer segment from a transport layer.

32. A computer-readable medium comprising computer program codes for monitoring and controlling message delivery over a single point-to-point connection including a wireless link between a sending node and a receiving node, the computer program codes comprising:

computer program code for establishing a single point-to-point connection including a wireless link between a sending node and a receiving node, the sending node and the receiving node both communicating over the connection using a common communication protocol;

computer program code for detecting when an incoming message that is destined for the receiving node is received over the connection from the sending node by examining the incoming message;

computer program code for determining a timeout corresponding to the time at which an acknowledgment message is expected over the connection from the receiving node by the sending node in response to the incoming message;

computer program code for forwarding the incoming message over the connection to the receiving node; and computer program code for sending a suppression message over the connection to the sending node if the acknowledgment message has not been sent to the sending node before the timeout expires, the suppression message suspending messages from being sent by the sending node to the receiving node.

33. A system for monitoring and controlling message delivery over a single point-to-point connection including a wireless link between a sending node and a receiving node, comprising:

means for establishing a single point-to-point connection including a wireless link between a sending node and a receiving node, the sending node and the receiving node both communicating over the connection using a common communication protocol;

means for detecting when an incoming message that is destined for the receiving node is received over the connection from the sending node by examining the incoming message;

means for determining a timeout corresponding to the time at which an acknowledgment message is expected over the connection from the receiving node by the sending node in response to the incoming message;

means for forwarding the incoming message over the connection to the receiving node; and means for sending a suppression message over the connection to the sending node if the acknowledgment message has not been sent to the sending node before the timeout expires, the suppression message suspending message from being sent from the sending node to the receiving node.

\* \* \* \* \*

UNITED STATES PATENT AND TRADEMARK OFFICE
CERTIFICATE OF CORRECTION

PATENT NO.        : 7,184,401 B2                                    Page 1 of 1
APPLICATION NO. : 09/777557
DATED              : February 27, 2007
INVENTOR(S)       : Foore et al.

It is certified that error appears in the above-identified patent and that said Letters Patent is hereby corrected as shown below:

IN THE SPECIFICATION

At column 1, line 38, after the word "unacknowledged", delete "message" and insert therefor --messages--.

At column 4, line 58, before the words "a separate", delete "instantiated" and insert therefor --substituted--.

IN THE CLAIMS

At claim 33, column 12, line 24, before the words "from being", delete "message" and insert therefor --messages--.

Signed and Sealed this

First Day of September, 2009

David J. Kappos
*Director of the United States Patent and Trademark Office*